(12) United States Patent
Prucher

(10) Patent No.: US 7,140,969 B2
(45) Date of Patent: Nov. 28, 2006

(54) OVERMOLDED YOKE ASSEMBLY

(75) Inventor: Bryan Paul Prucher, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 245 days.

(21) Appl. No.: 10/646,237

(22) Filed: Aug. 22, 2003

(65) Prior Publication Data

US 2005/0043103 A1 Feb. 24, 2005

(51) Int. Cl.
*F16D 3/16* (2006.01)

(52) U.S. Cl. ............... 464/134; 464/902; 464/903; 403/57

(58) Field of Classification Search ............... 464/134, 464/902, 903, 905; 403/58, 57, 74
See application file for complete search history.

(56) References Cited

U.S. PATENT DOCUMENTS

| | | | |
|---|---|---|---|
| 2,598,749 A * | 6/1952 | Anderson | ............... 427/327 |
| 2,990,018 A * | 6/1961 | Moore | ............... 416/134 R |
| 3,545,232 A * | 12/1970 | Gerhard et al. | ............. 464/131 |
| 3,662,569 A * | 5/1972 | Williams | ............... 464/128 |
| 3,764,647 A | 10/1973 | McDow | |
| 3,880,416 A | 4/1975 | Horwitz | |
| 4,272,972 A * | 6/1981 | James | ............ 464/119 |
| 5,259,937 A * | 11/1993 | Hatano et al. | .............. 205/149 |
| 5,397,272 A | 3/1995 | Smiley et al. | |
| 5,469,931 A * | 11/1995 | Kawata et al. | ............. 180/379 |
| 5,632,685 A | 5/1997 | Myers | |
| 5,733,145 A | 3/1998 | Wood | |
| 5,954,586 A | 9/1999 | Kirson | |
| 6,135,667 A | 10/2000 | Debisschop | |
| 6,149,506 A | 11/2000 | Duescher | |
| 6,203,438 B1 | 3/2001 | Kirson | |
| 6,348,002 B1 | 2/2002 | Breese | |
| 6,367,680 B1 | 4/2002 | Duggan | |
| 6,422,947 B1 | 7/2002 | Kelly et al. | |

FOREIGN PATENT DOCUMENTS

| | | | |
|---|---|---|---|
| FR | 2236410 A1 | * | 7/1975 |
| JP | 2002039206 A | * | 2/2002 |
| JP | 2002181070 A | * | 6/2002 |
| JP | 2002181070 A | * | 6/2002 |

* cited by examiner

*Primary Examiner*—Kenneth Thompson
(74) *Attorney, Agent, or Firm*—Harness, Dickey & Pierce, P.L.C.

(57) ABSTRACT

A universal joint having a first yoke including a body portion and an overmold portion. The body portion includes a base and a pair of arms that extend from the base. A trunnion assembly is coupled to the first yoke and extends between the arms. A second yoke is coupled to the trunnion assembly.

7 Claims, 5 Drawing Sheets

OVERMOLDED YOKE ASSEMBLY

FIELD OF THE INVENTION

The present invention relates to universal joints and more particularly to a universal joint that employs one or more overmolded yoke assemblies.

BACKGROUND OF THE INVENTION

The universal joint is well known in the art and commonly employed for use in the drivelines of automobiles and trucks. The universal joint transmits power, motion, or both, between two rotating shafts. The axes of the shafts are always intersecting while the bending angle between them is permitted to change during operation.

A typical universal joint includes a pair of opposed yokes that are axially aligned with one another. Each yoke has a pair of opposed axially extending arms that typically define diametrically opposed bores for receiving the bearing cups that support a spider or trunnion. The trunnion is typically cross-shaped, having bearing ends that are sized to be received into bearing cups.

The bearing cups are typically secured to the yokes by means of a circumferential groove formed in the surface of the bearing cup and a matching circumferential flange formed in the openings of the yokes. Due to the sizing of the bearing cups and openings, the bearings must be carefully aligned with the yokes in order to insert the bearings into the extending arms of the yokes. The difficulty of this operation is compounded since the trunnion must be aligned with the bearing cups in the opposing yoke. Therefore, even minor variances in the alignment between the bearing cups and the openings in the yokes can impede the assembly of the universal joint.

Accordingly, it is an object of the present invention to provide the art with a new universal joint yoke assembly and method of construction that eliminates the need for high precision machining and time consuming alignment between the opposing yokes and the trunnion while reducing fabrication costs.

SUMMARY OF THE INVENTION

A universal joint is provided having a first yoke including a body portion and an overmold portion. The body portion includes a base and a pair of arms that extend from the base. A trunnion assembly is coupled to the first yoke and extends between the arms. A second yoke is coupled to the trunnion assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
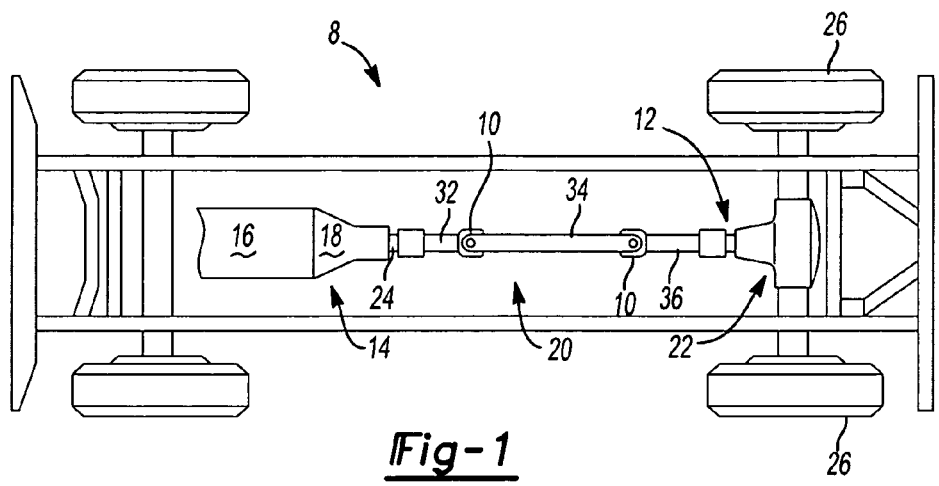
FIG. 1 is a schematic illustration of an exemplary vehicle having a universal joint constructed in accordance with the teachings of the present invention.

With reference to FIG. 1 of the drawings, an exemplary vehicle 8 is illustrated to include a universal joint 10 that is constructed in accordance with the teachings of the present invention. The vehicle 8 also includes a driveline 12 driven by a powertrain 14. The powertrain 14 includes an engine 16 and a transmission 18. The driveline 12 includes a propshaft assembly 20 and a rear axle 22.

The engine 16 is mounted in an in-line or longitudinal orientation along the axis of the vehicle 8. The output of the engine 16 is selectively coupled via a conventional clutch (not specifically shown) to the input of the transmission 18 in order to transmit rotary power therebetween. The input of the transmission 18 is commonly aligned with the output of the engine 16 for rotation about a rotary axis. The transmission 18 further includes an output 24 coupled for rotation to the propshaft assembly 20. Drive torque is transmitted through the propshaft assembly 20 to the rear axle 22 where it is selectively transferred to a pair of wheels 26.

The universal joint 10 is employed to accommodate rotation of the propshaft assembly 20 as the engine 16 is not located within the same plane as the rear axle 22. The propshaft assembly 20 includes a first driveline component 32 coupled to a second driveline component 34. The universal joint 10 rotatingly couples the first driveline component 32 to the second driveline component 34. The first and second driveline components 32, 34 are preferably formed using radial forging wherein the driveline components 32, 34 are rotary swaged over a mandrel using computer numerical control.

Figure 2:
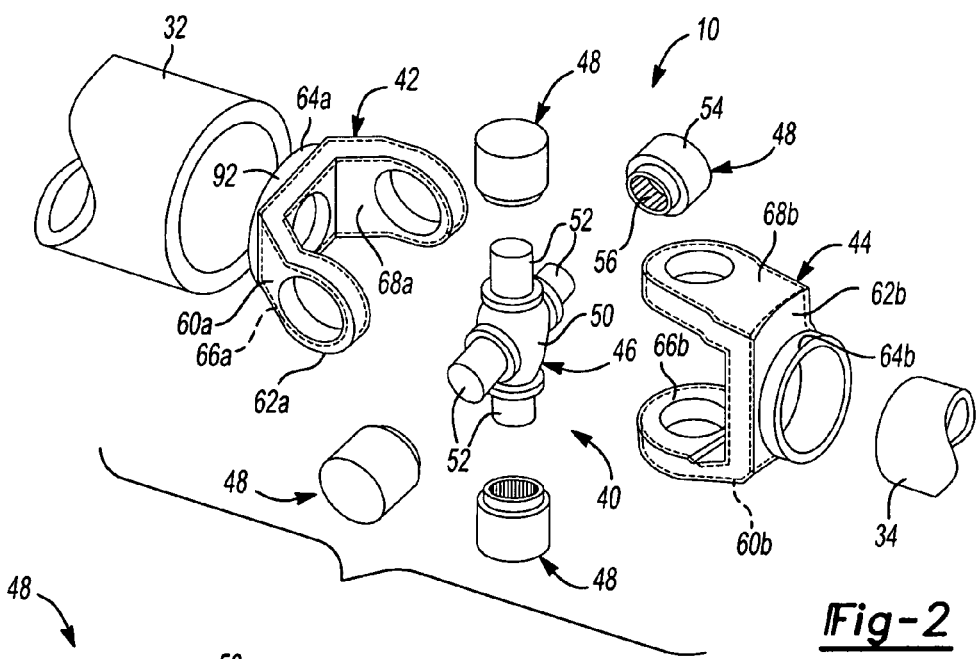
FIG. 2 is an exploded perspective view of the universal joint.

In FIG. 2, the universal joint 10 is illustrated in greater detail. In the example provided, the universal joint 10 is illustrated to include a trunnion assembly 40 operably coupled to a first yoke assembly 42 and a second yoke assembly 44. The first yoke assembly 42 is illustrated to be configured so that it may be fit into and readily welded to the first driveline components 32 while the second yoke assembly 44 is illustrated to be configured so that the second driveline component 34 may be slid into and readily welded to it.

The trunnion assembly 40 includes a trunnion or spider 46 and a plurality of bearings 48. The trunnion 46 includes a central portion 50 with cylindrical members 52 extending therefrom. The members 52 are aligned generally perpendicular to one another in a common plane to form a cross-shape. Each bearing 48 is detachably mounted to the distal end of an associated one of the members 52.

Each bearing 48 includes a cup-like structure 54 and a plurality of bearing elements 56, such as rollers, that are arranged about the inside diameter of the bearing cup. The bearings 48, when mounted on the members 52 in a conventional and well known manner, are rotatable with respect to the trunnion 46.

Figure 3:
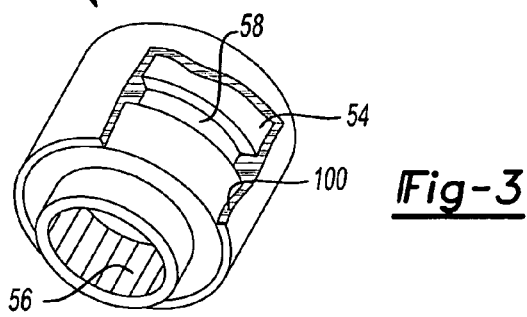
FIG. 3 is a perspective view of an alternate embodiment of the bearing shown in FIG. 2.

The cup-like structures 54 are generally cylindrical in shape and have a smooth outer surface. Alternatively, a groove 58, as illustrated in FIG. 3, may be formed along the outer surface of the cup-like structure 54 to aid in the coupling of the trunnion assembly 40 to the first and second yoke assemblies 42, 44. A more detailed description of this alternate embodiment will be given below.

Returning to FIG. 2, the first and second yoke assemblies 42, 44 each include a body portion 60a and 60b, respectively, and an overmold portion 62a and 62b, respectively. Each body portion 60a and 60b includes a base 64a and 64b, respectively, and a pair of arms 66a, 68a and 66b, 68b, respectively, that project outwardly from the base 64a and 64b, respectively. In the particular embodiment illustrated, the body portion 60a of the first yoke assembly 42 is a machined casting, while the body portion 60b of the second yoke assembly 44 is a stamping that has been formed in a progressive die (not shown). As those skilled in the art will appreciate, the construction of the body portions 60a and 60b of the first and second yoke assemblies 42, 44 is generally similar and as such, only the body portion 60b of the second yoke assembly 44 will be discussed in detail herein.

Figure 4:
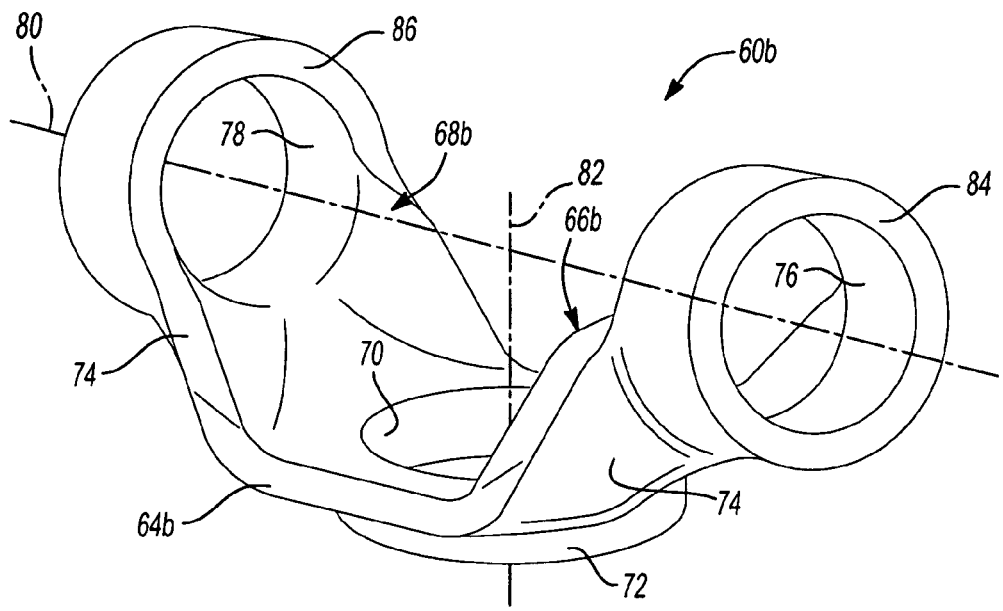
FIG. 4 is a perspective view of a body portion of a yoke assembly of the universal joint in FIG. 2.

In FIG. 4, the second yoke assembly 44 is illustrated in greater detail. The base 64b includes a base opening 70, a base flange or ring 72 and a pair of transition sections 74 to which the arms 66b, 68b are coupled. In the example provided, the base opening 70 extends through the base ring 72 and is sized to receive the second driveline component 34 (FIG. 1) so that the body portion 60b may be fit over and welded (about the base ring 72) to the second driveline component 34. Moreover, base opening 70 may receive a cap (not shown) that may be secured in place by the overmold portion 62b.

The transition sections 74 are somewhat curved and aid in supporting the arms 66b, 68b. Each of the arms 66b, 68b includes an opening 76, 78 respectively, that are aligned to one another and sized to receive at least a portion of an associated one of the cup-like structures 54. The axis 80 of the openings 76, 78 is generally perpendicular to the axis 82 of the base opening 70. In the particular example provided, the arms 66b, 68b terminate at their distal ends in an annular structure or ring 84, 86 respectively, but those skilled in the art will appreciate that the structures that form the openings may be configured differently.

Figure 5:
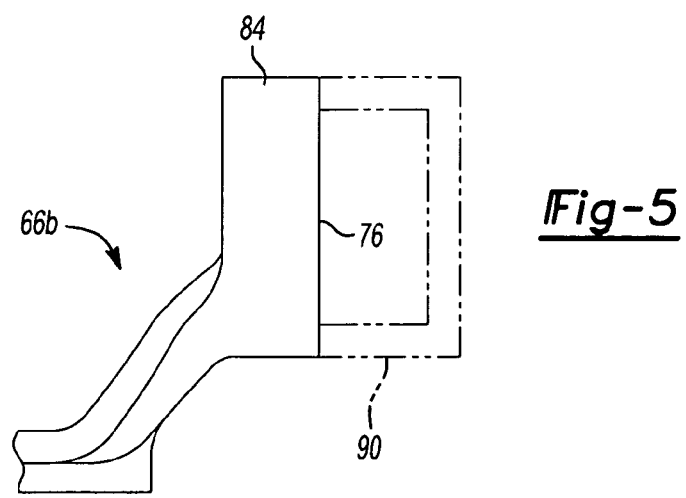
FIG. 5 is a side plan view of an arm of the yoke assembly of FIG. 4.

In the embodiment provided, the body portion 60b is unitarily formed through an appropriate metal forming process, such as stamping. More specifically, a cold extrusion process is employed to form the distal ends of the arms 66b, 68b. With reference to FIG. 5, the distal end of the arms (e.g., arm 66b) includes an extruded end piece 90 which is generally cup-shaped. The extruded end piece 90 is eventually trimmed in an appropriate process (e.g., sawing) to leave a ring (ring 84 in the portion illustrated) with an opening (opening 76 in the portion illustrated) formed therethrough. The end piece 90 may be trimmed either before or after the arms 66a, 66b are formed. As those skilled in the art will appreciate, either of the body portions 60a, 60b may be formed in the alternative by any suitable metal forming process, including closed die forging, open die forging with welding and/or casting.

Returning briefly to FIG. 2, the body portion 60a of the first yoke assembly 42 is generally similarly constructed, except that the base portion 60a includes a projecting stem 92, which may be hollow or solid, that is fitted into and welded to the first driveline component 32.

Figure 6:
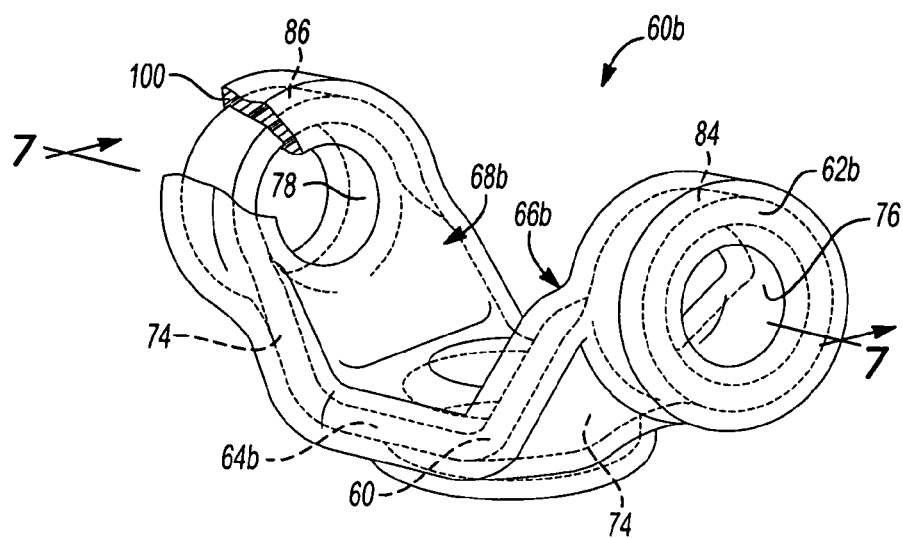
FIG. 6 is a perspective view of the yoke assembly of FIG. 2.
Figure 7:
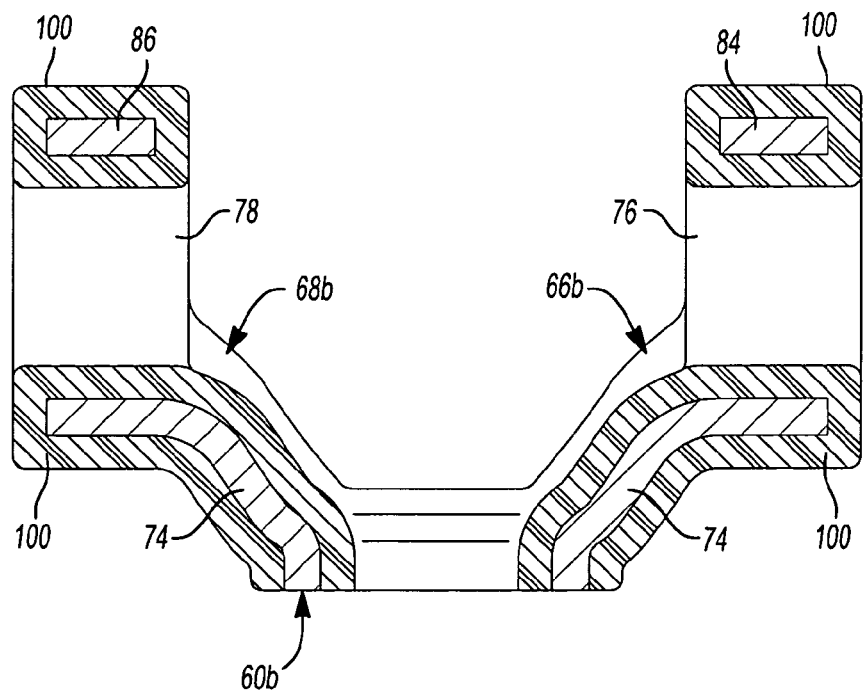
FIG. 7 is a cross-sectional view of the yoke assembly taken along line 7—7 in FIG. 6.

With reference to FIGS. 6 and 7, the overmold portion 62b of the second yolk assembly 44 is illustrated in greater detail. In the particular example provided, an overmold material 100 surrounds or encapsulates the base 64b, the arms 66b, 68b, the rings 84, 86, and the base ring 72. However, the overmold material 100 may alternatively surround any portion of the second yolk assembly 44. As will be described below, the overmold material 100 is used to capture the bearings 48 within the openings 76, 78.

The overmold material 100 is preferably selected for its ability to be injected into a mold in a semi-fluid or fluid state at an elevated temperature and to retain its strength after it has cooled and solidified, and as such, plastics and metals may be readily employed to form the overmold portion 62a, 62b. For example, a polymeric material, such as high density glass filled nylon, may be employed, or a metal, such as thixoforged aluminum, may be employed for embodiments requiring additional strength.

Figure 8:
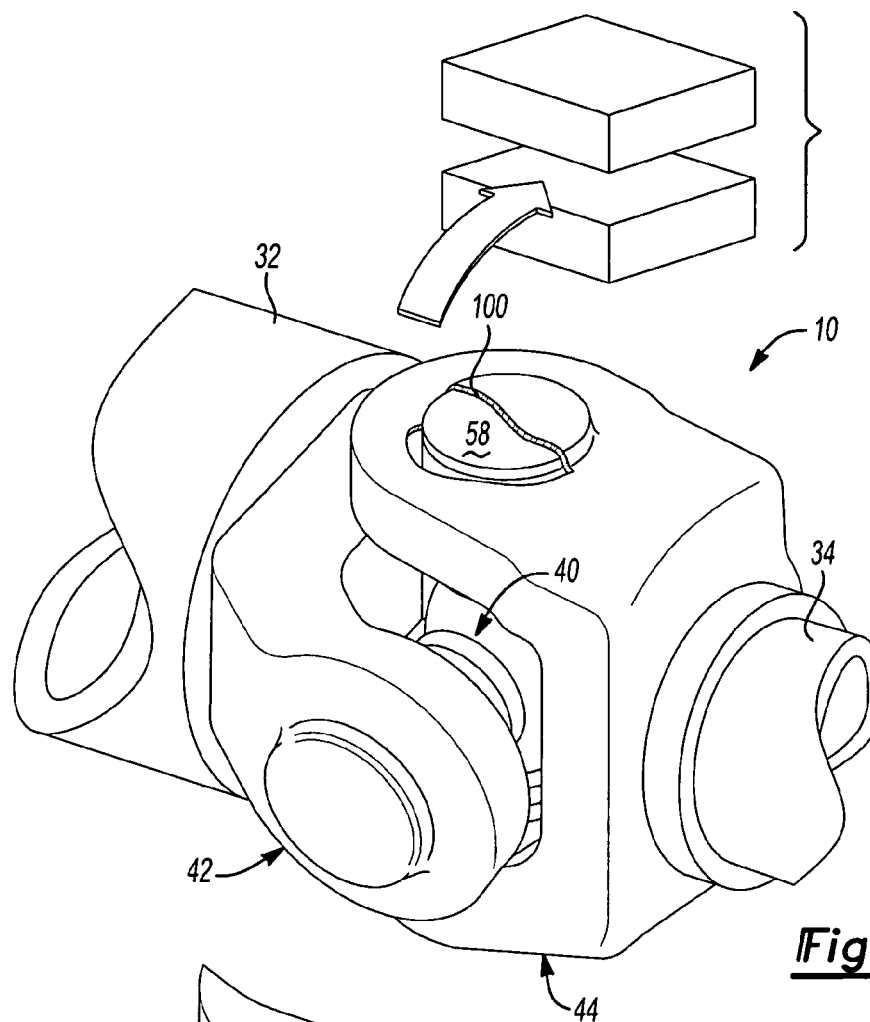
FIG. 8 is a perspective view of the fully assembled universal joint.

With reference to FIG. 8, the fully assembled universal joint 10 and method of construction will now be described. First, the first yoke assembly 42 and the second yoke assembly 44 are aligned opposite one another in a mold 102. For purposes of clarity, the mold 102 is only schematically illustrated. However, the shape of the cavity defined by the mold 102 is inherent from the shapes of the various pieces of the universal joint 10 and their relative positions. The trunnion 46 is then placed between the first yoke assembly 42 and the second yoke assembly 44 within the mold 102 and the bearings 48 are attached to the extending members 52 such that each bearing 48 is located within one of the openings 76, 78 of the first yoke assembly 42 and the second yoke assembly 44, respectively.

The mold 102 is closed and the overmold material 100 is then injected into the mold 102, either in a semi-fluid or fluid state, using conventional methods known in the art. In the example provided, the overmold material 100 entirely covers the bearings 48 and flows between the bearings 48 and the rings 84, 86 of the first yoke assembly 42 and the second yoke assembly 44, respectively. In this way, the overmold material 100, when solidified, fixes the bearings 48 with respect to the first yoke assembly 42 and the second yoke assembly 44. The fluidity of the overmold material 100 as it is injected into the mold 102 automatically adjusts to fill the space between the bearings 48 and the rings 84, 86, thereby eliminating the need to precisely align the trunnion 46 between the first yoke assembly 42 and the second yoke assembly 44.

Alternately, the groove 58 formed in the bearings 48, as shown in FIG. 3, may serve to fix the bearings 48 with respect to the first yoke assembly 42 and the second yoke assembly 44. In this embodiment, the overmold material 100 need not encapsulate the cup-like structure 54, but rather need only fill the groove 58 formed in the cup-like structure 54 to fix the bearing 58 relative to the body portion 60b.

Figure 8A:
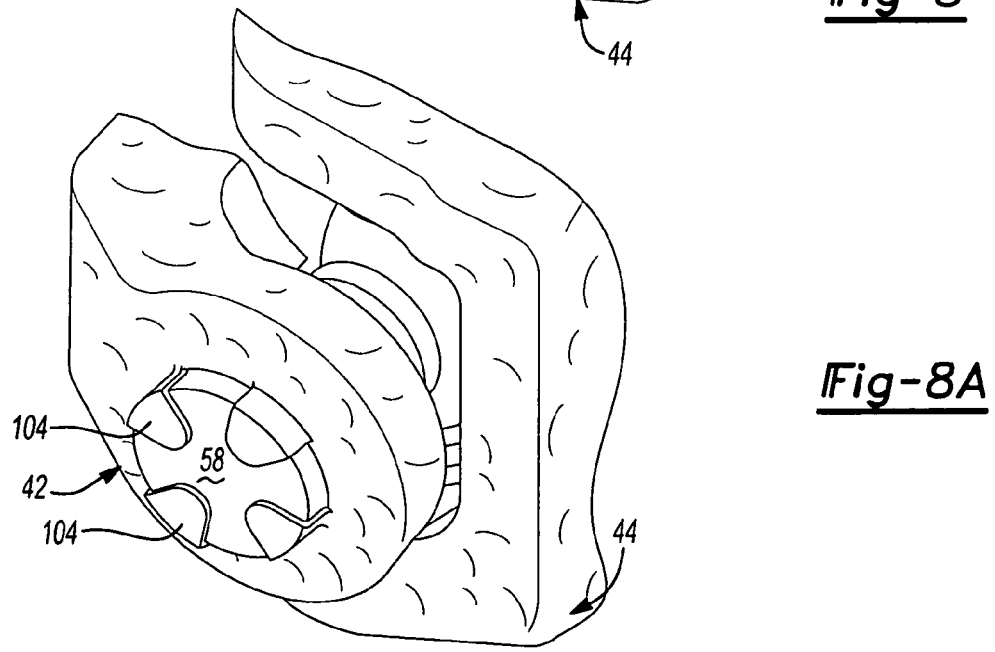
FIG. 8A is a perspective view of an alternative arrangement of the universal joint.

Turning briefly to FIG. 8A, still another embodiment of capturing the bearing 58 is illustrated. Specifically, a plurality of tabs 104 formed from the overmold material 100 serve to capture the bearing 58 and fix the bearing 58 relative to the body portion 60b. While in the particular example provided four tabs 104 are illustrated, it is to be appreciated that any number of tabs 104 may be employed.

Moreover, dimples may be formed in the overmold material 100 in order to replicate a metallic-like cast surface. These dimples are shown in FIG. 8A on the surface of the overmold material 100 as partial textures. The overmold material 100 may also be either painted or dyed during molding to replicate a metallic-like material.

Once the universal joint 10 has been formed and assembled, the first driveline component 32 may be welded to the first yoke assembly 42 and the second driveline component 34 may be welded to the second yoke assembly 44. In order to preserve the overmold material 100 from melting under the heat of a typical fusion weld, it is preferable to use a non-fusion welding method, such as magnetic welding or spin welding, for example.

Occasionally, the bearings 48 may be damaged through debris or worn through use such that it will be necessary and/or desirable to replace or repair the bearings 48. In such cases, the overmold material 100 is cut from the bearing 48 and the bearing 48 is removed. A replacement bearing is then inserted into the opening that is defined by the overmold material 100 and secured to the first yoke assembly 42 or the second yoke assembly 44 by suitable means.

Figure 9:
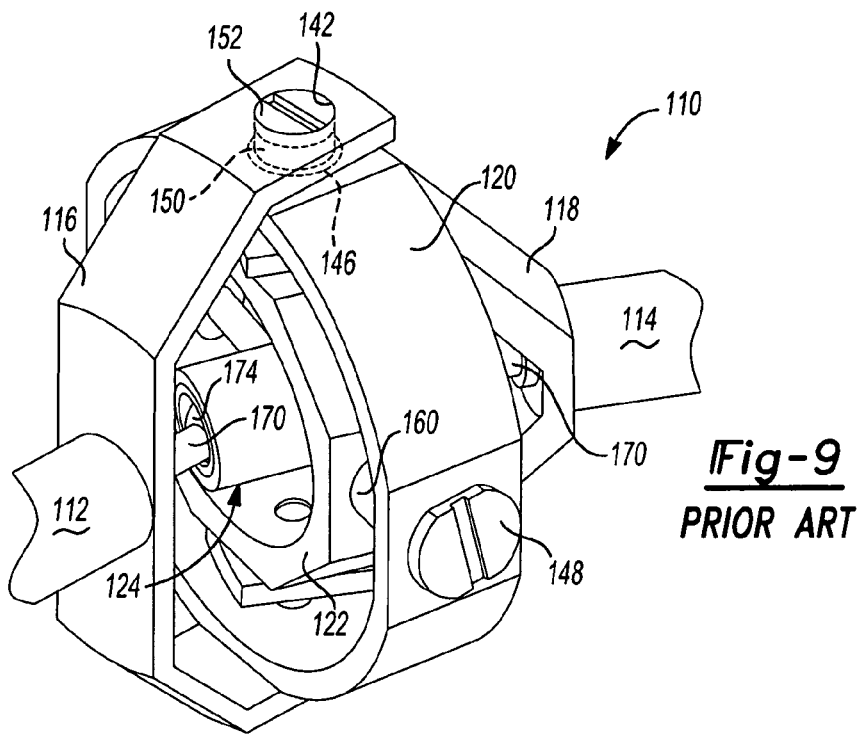
FIG. 9 is a perspective view of a constant velocity yoke assembly.

With reference now to FIG. 9, an alternate universal joint known in the art as a constant velocity joint, disclosed in U.S. Pat. No. 5,954,586, herein incorporated by reference in its entirety, is generally indicated by reference numeral 110. The constant velocity joint 110 transmits rotational motion from a first shaft 112 to a second shaft 114 while holding the angular velocities of the shafts equal at all times.

Joint 110 typically comprises an outer yoke assembly 116 coupled to the first shaft 112, an inner yoke assembly 118 coupled to the second shaft 114, an outer ring 120, an inner ring 122, and a constraining mechanism 124. It will be appreciated that the yoke and ring mechanism of joint 110 enables the two shafts 112 and 114 to rotate about their axes together while enabling the bending angle between the two shafts 112 and 114 to change.

The end portions of the outer yoke 116 are formed with two in-line bores 142, one of which is visible in the drawings. Together, the bores 142 define an axis which is perpendicular to the longitudinal axis of the first shaft 112. The outer ring 120 is formed with two pairs of in-line bores 146 (one of which is shown) and 148 (one of which is shown) wherein the bores 146 define an axis which perpendicularly intersects the axis defined by the bores 148.

The outer ring 120 is rotatably connected to the outer yoke 116 via a pair of pins 150 with bearing end caps 152 mounted within the bores 142 and 146. The bearings 152 are rotatable with respect to the pins 150 and permit relative rotation between the outer yoke 116 and the outer ring 120 about the axis defined by the bores 142 and 146. Other suitable connections are also possible and are within the scope of the present invention.

The inner ring 122 is similarly connected to the inner yoke 118 in that two in-line bores (not shown) on the inner ring 122 are aligned with two in-line bores (not shown) on the inner yoke 118. The inner ring 122 is rotatably connected to the yoke 118 via a pair of pins (not shown) and bearings (not shown) mounted within the bores. The bearings are mounted on the pins and are rotatable with respect to the pins. The pins and bearings permit relative rotation between the inner yoke 118 and the inner ring 122. While the details of this connection are not shown, they are substantially similar to the connection between the outer yoke 116 and the outer ring 120 to provide a complete understanding of their construction and function.

The inner ring 122 is typically formed with cylindrical portions 160 extending therefrom. When the joint 110 is assembled, the cylindrical portions 160 of the inner ring 122 are placed within bores 148 of the outer ring 120 and are held there by suitable bearings 152. The bearings 152 enable the cylindrical portions 160 to rotate therewithin, thereby providing rotation between the inner ring 122 and the outer ring 120.

In the particular example provided, the yokes 116 and 118 are illustrated as being double-sided. However, single sided yokes or any other suitable shape as desired which provides connection to an axis perpendicular to the relevant shaft axis may be employed.

Joint 110 additionally comprises rods 170 connected to, or integrally formed with, the first and second shafts 112 and 114. The rods 170 terminate in a ball 174 (one of which is shown) whose center is located on the longitudinal axis of the first shaft 112 and on the longitudinal axis of the second shaft 114. The rods 170 are received within the constraining mechanism 124.

Figure 10:
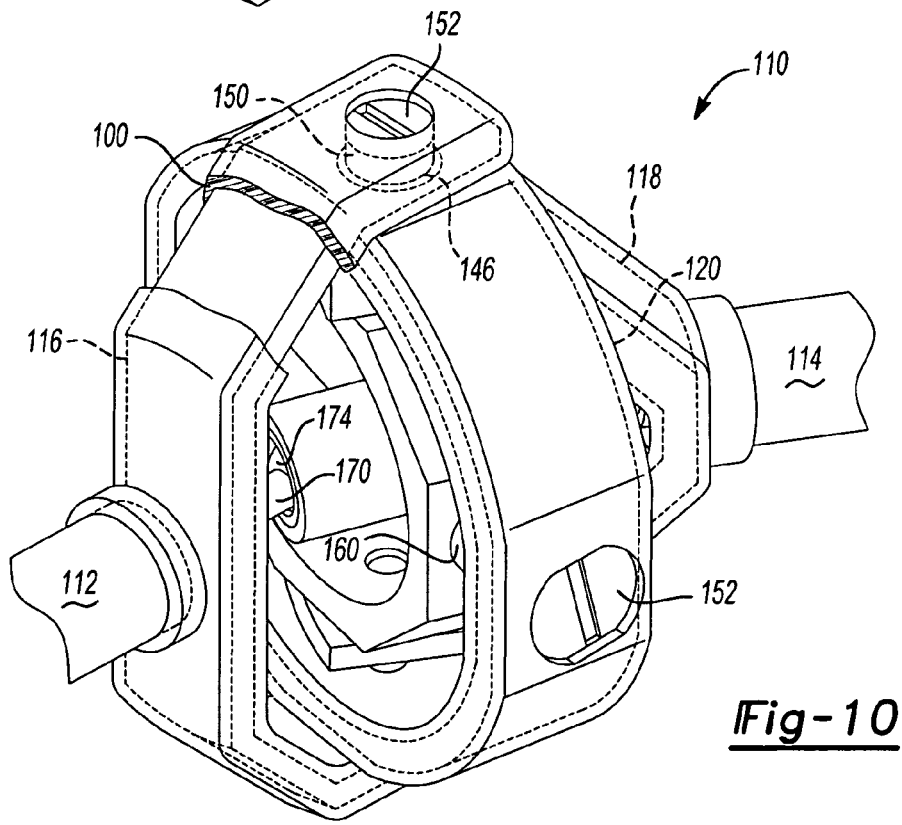
FIG. 10 is a perspective view of the constant velocity yoke assembly of FIG. 9 having an overmold material formed thereon and constructed in accordance with the teachings of the present invention.

With reference to FIG. 10, the constant velocity joint 110 is illustrated with the overmold material 100 formed thereon. In the particular example provided, the overmold material 100 is formed around the outer yoke 116 and the inner yoke 118. The overmold material 100 surrounds the bearings 152 and couples the bearings to the outer yoke 116 and the inner yoke 118. Construction, materials, and assembly of the constant velocity joint 110 are substantially similar to the universal joint 10 as described above.

The overmold material 100 not only provides an improved connection between the bearings 48 and 152 to the yoke assemblies 42, 44,116, 118, but also provides various other benefits to the universal joint 10 and constant velocity joint 110. For example, the overmold material 100 protects the yoke assemblies 42, 44, 116, 118 from environmental damage, such as corrosion. Moreover, by increasing the strength of the yoke assemblies 42, 44, 116, 118, the yoke assemblies 42, 44, 116, 118 may be constructed having a reduced thickness.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A universal joint comprising:
   a first yoke including a body portion and an overmold portion, the body portion including a base and a pair of first arms that extend from the base;
   a trunnion assembly coupled to the first yoke and extending between the first arms; and
   a second yoke having a pair of second arms, the second yoke being coupled to the trunnion assembly such that the trunnion assembly extends between the second arms;
   wherein the pair of first arms each include an opening formed therethrough that are aligned with one another and the overmold portion at least partially surrounds the portion of the first arms that define the openings; and
   wherein the overmold portion at least partially fills a groove formed in a portion of the trunnion assembly to thereby secure the portion of the trunnion assembly to the overmold portion.

2. The universal joint of claim 1, wherein the base and the pair of first arms of the first yoke are unitarily formed.

3. The universal joint of claim 2, wherein the base and the pair of first arms of the first yoke are unitarily formed.

4. The universal joint of claim 1, wherein the overmold portion is formed of a material selected from a group of materials consisting of plastics and metals.

5. The universal joint of claim 4, wherein the overmold portion is formed of nylon.

6. A yoke assembly for coupling a first driveline component to a second driveline component, the yoke assembly comprising:

a first yoke having a first body portion and a first overmold portion molded thereto, the first yoke being adapted for coupling to the first driveline component;

a second yoke having a second body portion and a second overmold portion molded thereto, the second yoke being adapted for coupling to the second driveline component; and a trunnion assembly coupled to the first and second yokes;

wherein at least one of the first and second overmold portions is directly coupled to the trunnion assembly wherein the first body portion includes a pair of first arms, the first arms defining a pair of aligned first openings that are configured to receive a first portion of the trunnion assembly wherein each of the first openings is round wherein the second body portion includes a pair of second arms, the second arms defining a pair of aligned second openings that are configured to receive a second portion of the trunnion assembly wherein each of the second openings is round wherein the trunnion assembly includes four bearings, each of the bearings being disposed in an associated one of the first and second openings wherein the first overmold portion fixes a first pair of the bearings to the first arms and the second overmold portion fixes a second pair of the bearings to the second arms wherein the first pair of bearings is partially encapsulated by a plurality of tabs formed from the first overmold portion.

7. A yoke assembly for coupling a first driveline component to a second driveline component, the yoke assembly comprising:

a first yoke having a first body portion and a first overmold portion molded thereto, the first yoke being adapted for coupling to the first driveline component;

a second yoke having a second body portion and a second overmold portion molded thereto, the second yoke being adapted for coupling to the second driveline component; and a trunnion assembly coupled to the first and second yokes;

wherein at least one of the first and second overmold portions is directly coupled to the trunnion assembly wherein the first body portion includes a pair of first arms, the first arms defining a pair of aligned first openings that are configured to receive a first portion of the trunnion assembly wherein each of the first openings is round wherein the second body portion includes a pair of second arms, the second arms defining a pair of aligned second openings that are configured to receive a second portion of the trunnion assembly wherein each of the second openings is round wherein the trunnion assembly includes four bearings, each of the bearings being disposed in an associated one of the first and second openings wherein the first overmold portion fixes a first pair of the bearings to the first arms and the second overmold portion fixes a second pair of the bearings to the second arms wherein a groove is formed in each of the first bearings, and wherein the first overmold portion at least partially fills each of the grooves.

* * * * *